United States Patent [19]
Kubota et al.

[11] Patent Number: 4,481,822
[45] Date of Patent: Nov. 13, 1984

[54] SYNTHETIC APERTURE ULTRASONIC TESTING APPARATUS WITH SHEAR AND LONGITUDINAL WAVE MODES

[75] Inventors: Jun Kubota; Junichi Ishii; Soji Sasaki, all of Hitachi, Japan

[73] Assignee: Hitachi, Ltd., Tokyo, Japan

[21] Appl. No.: 434,879

[22] Filed: Oct. 18, 1982

[51] Int. Cl.³ .............................................. G01N 29/00
[52] U.S. Cl. .......................................... 73/625; 73/626; 73/642; 73/628
[58] Field of Search ................. 73/596, 625, 626, 644, 73/606, 607, 642, 628

[56] References Cited

U.S. PATENT DOCUMENTS

| | | | |
|---|---|---|---|
| 2,912,854 | 11/1959 | Schubring | 73/644 |
| 3,548,642 | 12/1970 | Flaherty et al. | 367/113 |
| 3,712,119 | 1/1973 | Cross | 73/625 |
| 3,868,847 | 3/1975 | Gunkel | 73/625 |
| 3,938,372 | 2/1976 | Sproule | 73/644 |
| 4,005,258 | 1/1977 | Dory | 73/607 |
| 4,038,865 | 8/1977 | Flambard et al. | 73/628 |
| 4,317,369 | 3/1982 | Johnson | 73/607 |
| 4,328,567 | 5/1982 | Dodge | 367/75 |

FOREIGN PATENT DOCUMENTS 2084731  4/1982  United Kingdom .................. 73/596

*Primary Examiner*—Howard A. Birmiel
*Attorney, Agent, or Firm*—Antonelli, Terry & Wands

[57] ABSTRACT

An ultrasonic synthetic aperture testing apparatus comprises transmitting/receiving sections having an ultrasonic wave probe for transmitting and receiving ultrasonic waves at multiple points on the surface of a steel material, an operation section for accumulating the received signals corresponding to the distance between the multiple points and a reproduction point in a desired region of the material under testing, and a display section for displaying an image formed as a result of this accumulation operation. The ultrasonic wave probe is provided with vibrators corresponding to the respective vibration modes so that two kinds of ultrasonic waves in different vibration modes may be transmitted and received. The accumulation section is provided with a mechanism which performs accumulation and arithmetic operation for the two kinds of waves in different modes.

9 Claims, 7 Drawing Figures

SYNTHETIC APERTURE ULTRASONIC TESTING APPARATUS WITH SHEAR AND LONGITUDINAL WAVE MODES

This invention relates to an ultrasonic testing apparatus for detecting the shape etc. of an object under testing by using ultrasonic waves, and more particularly to an ultrasonic testing apparatus for testing the object by using longitudinal and transverse ultrasonic waves.

The synthetic aperture technique or method is known as a method for enhancing the direction resolution, which expresses the ability of discriminating between two objects under testing (e.g. a flaw in the steel materials). According to this method which is described, for example, in the article "Sequential Synthetic Aperture Sonar System-A Prototype of a Synthetic Aperture Sonar System", by T. Sato et al, IEEE Transactions on Sonics and Ultrasonics, Vol. SU-24, No. 4, July 1977, pp. 253-259, information is obtained as follows. Namely, ultrasonic waves are transmitted and received at multiple points, and all these signals are synthesized in such a manner that the phases of the received signals obtained at these points coincide with each other.

The direction resolution $\delta$ of the synthetic aperture method is expressed as $\delta = \lambda/\phi$, where $\phi$ is the angle subtended by the transmission-reception region (aperture) seen toward a reflection body (a to-be-tested object). The direction resolution becomes higher according as $\delta$ is smaller. Therefore, recently, an ultrasonic wave probe with a large value of $\phi$ is used. With use of spherical vibrators, the focus is placed on a position of the surface of a steel material. However, as will be mentioned later, as the refraction angle of the ultrasonic wave becomes larger, the sensitivity of this prior art arrangement decreases. This placed a limit on the angle $\phi$. A further improvement has been needed in the direction resolution of the synthetic aperture method.

An ultrasonic testing apparatus of this invention comprises a transmission-reception part including an ultrasonic wave probe for transmitting and receiving ultrasonic waves at multiple points on the surface of a to-be-tested body; an operation part which accumulates the received signals corresponding to the distances between the multiple points and the reproduction point of a desired region of the to-be-tested object; and a display part for displaying an image formed by the accumulated result. The ultrasonic wave probe is provided with vibrators responding to each vibration mode so that two kinds of ultrasonic waves in different vibration modes may be transmitted and received. The accumulation section is provided with a mechanism for performing this accumulation operation corresponding to the above two kinds of waves in different vibration modes.

The present invention will be made more apparent from the following detailed description taken in conjunction with the accompanying drawings, in which.

Figure 1:
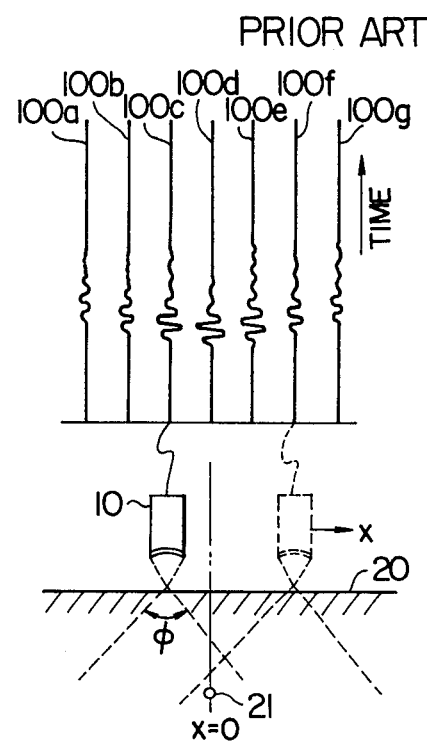
FIGS. 1 and 3 are explanatory diagrams showing the principle of this invention.
Figure 2:
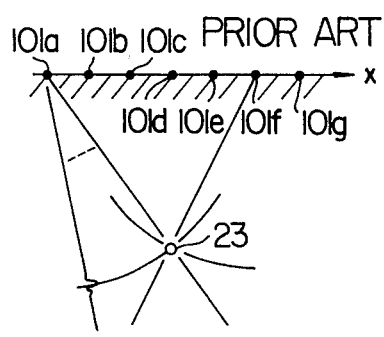
Figure 3:
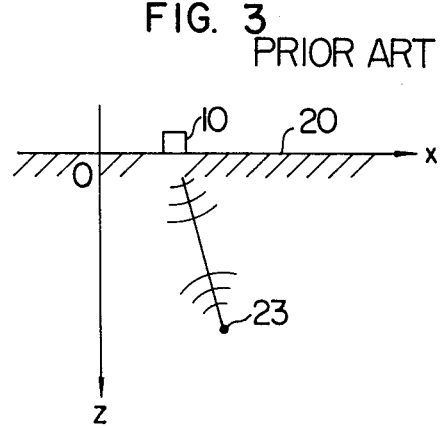

Before the explanation of the embodiments of this invention, a brief explanation will be made of an example where the synthetic aperture method is applied to an ultrasonic wave testing apparatus. Reference is made to FIGS. 1 to 3.

In FIG. 1, an ultrasonic wave probe 10 and flaw detection signals 100a to 100g are shown. These are the signals reflected from a to-be-tested object 20, determined by the scanning method and the scanning position of the probe. Here, scanning of the ultrasonic wave probe 10 is one dimensional along the direction of x axis and reproduction of image is done in the tomographic way. In the ultrasonic wave probe 10, vibrators with a short focal point convex surface are used in order that transmission and reception of ultrasonic waves of an acoustic discontinuous part 21 within an object to be tested 20, may occur in an as wide as possible scan region. Namely, the ultrasonic waves are focused on a focal point and thereafter diffused toward the object 20, whereby the above-mentioned function is realized. The presence of the acoustic discontinuity 21 in the to-be-tested object yields the ultrasonic flaw detection signals 100a to 100g.

The procedure for obtaining a tomographic image from the ultrasonic flaw detection signals will be explained next with reference to FIG. 2. Positions of the ultrasonic wave probe corresponding to the ultrasonic flaw detection signals 100a to 100g are denoted as 101a to 101g, respectively. Let us consider the formation of an image of the reproduction point 23 corresponding to the acoustic discontinuity 21 (see FIG. 1) of the to-be-tested object 20. The distance between the position 101a of the ultrasonic wave probe and the reproduction is measued. The propagation time is calculated from the sound velocity in the to-be-tested object. Using this propagation time, a signal for the image data is derived from the ultrasonic flaw detection signal 100a. Similar operations are performed for the ultrasonic flaw detection signals 100b to 100g, and these image data are accumulated. This completes the image formation of the reproduction point 23. Next, the above operation is performed for each point in the tomographic image. This procedure enables the tomographic image reproduction using the synthetic aperture method. The data of the detection signal 100a are superimposed on the image data of the points lying at an equi-distance from the position 101a of the ultrasonic wave probe. Data on the other points are superimposed in the same way, whereby the image of the reproduction point 23 corresponding to the acoustic discontinuity 21 is obtained.

The image formation process using the synthetic aperture method will be explained by using mathematical equations with reference to FIG. 3. We assume that the ultrasonic wave probe 10 is scanned in the direction of x-axis and that the image reproduction is tomographic in the x-z plane. A point $(x_o, z_o)$ in the x-z plane means that its coordinate is given by $x = x_o$, $z = z_o$. The coordinate of the ultrasonic wave probe is given by $(x_o, O)$, and the to-be-tested object situates in the region of $z \geq O$. The coordinate of a reproduction point 23 within the region of the to-be-tested object is given by $(x_r, z_r)$. The ultrasonic wave probe 10 transmits a wave expressed as follows at a time t.

$$S_t(t) = u(t) \sin (2\pi f_o t)$$

-continued $$u(t) = \begin{cases} 1 & 0 \leq t \leq n\frac{1}{f_0} \\ 0 & \text{otherwise} \end{cases}$$

where $f_0$ is the frequency of the carrier wave. The wave is reflected from the acoustic discontinuity in the to-be-tested object. The received signal $S_r(x_0, t)$ at a probe position $(x_0, 0)$ is expressed as $$S_r(x_0,t) = \int \rho(x,z) S_t \left( t - \frac{2\sqrt{(x-x_0)^2 + z^2}}{v} \right) dxdz, \quad (1)$$

where v is the sound velocity in the to-be-tested object, $\rho(x, z)$ is the reflectivity of the sound wave at a point $(x, z)$, and the integral is performed in the whole space of the object under testing. The intensity $I(x_r, z_r)$ of a reproduced image at the reproduction point $(x_r, z_r)$ is expressed by the following equation.

$$I(x_r, z_r) = \left| \int S_r \left( x_0, \frac{2\sqrt{(x_r-x_0)^2 + z_r^2}}{v} \right) dx_0 \right|^2 \quad (2)$$

The equation (2) is a basic equation of the synthetic aperture method. The image of the reproduction point 23 is formed and displayed in accordance with the result of calculation by eq. (2).

Figure 4:
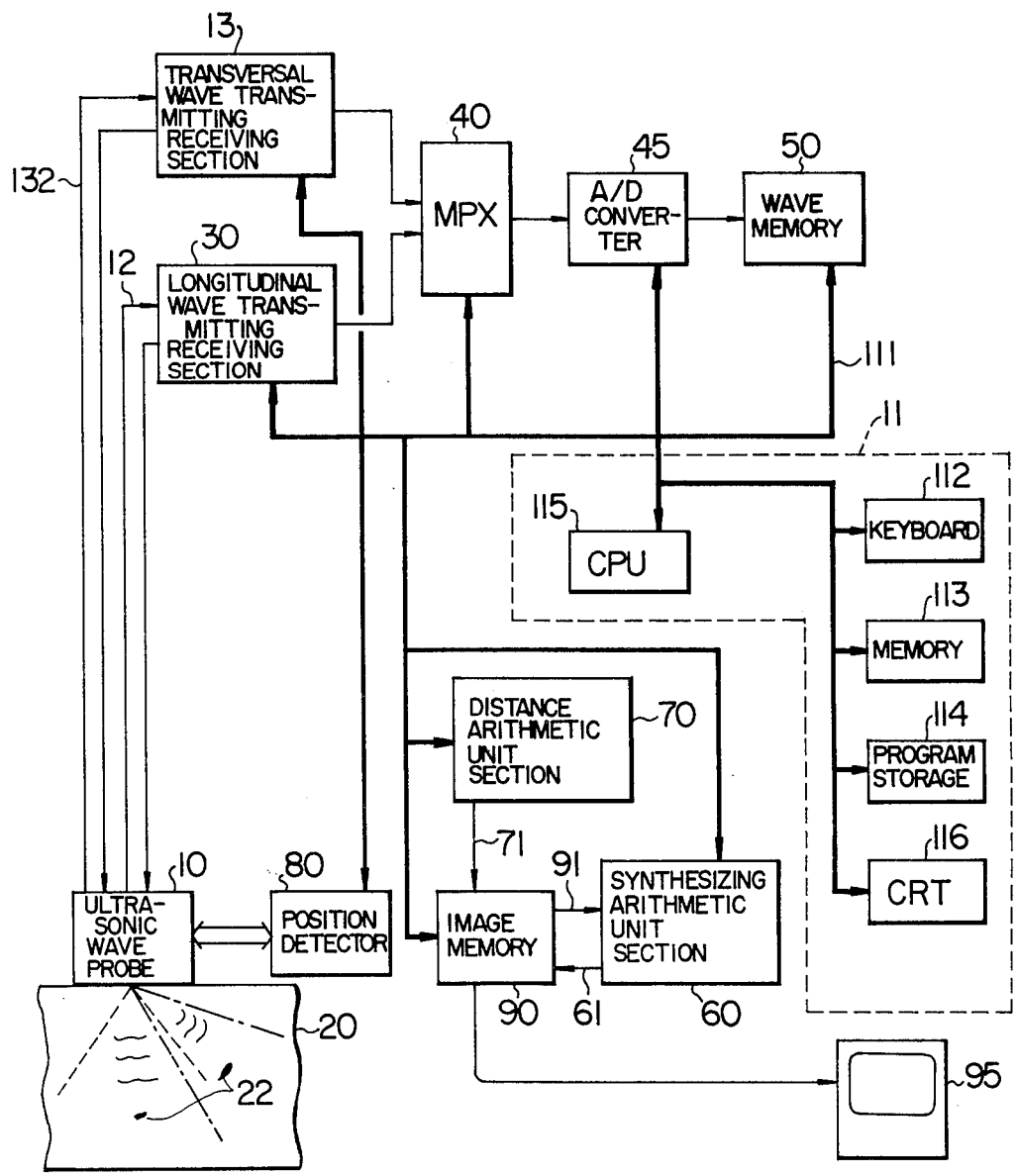
FIG. 4 is a block diagram of one embodiment of this invention.
Figure 5:
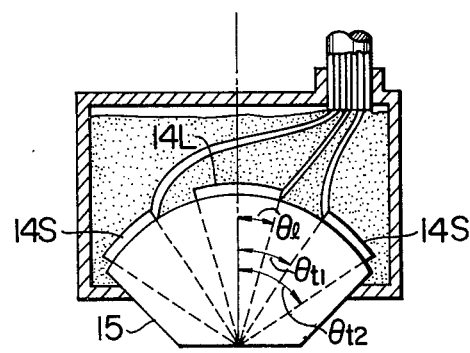
FIG. 5 is a diagram showing the detailed structure of an ultrasonic wave probe as used in this invention.
Figure 6:
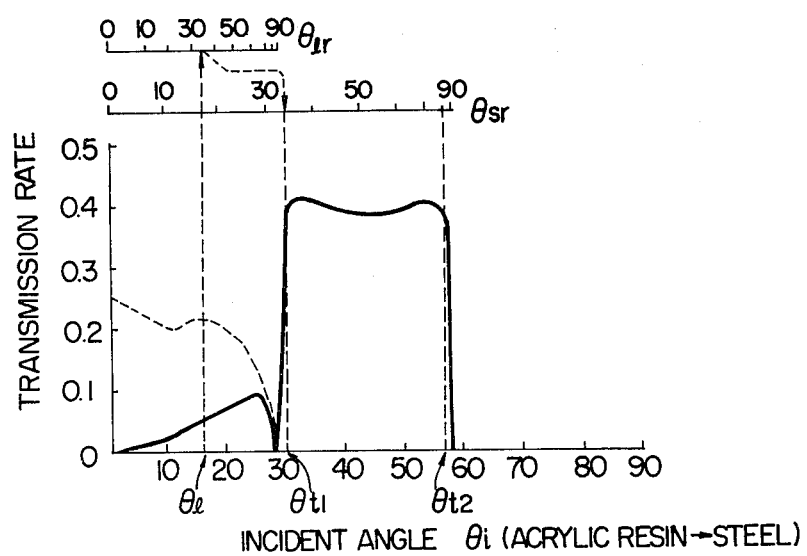
FIG. 6 is an explanatory diagram showing the principle of the ultrasonic wave probe shown in FIG. 5.

FIG. 4 shows a whole constitution of one embodiment of this invention. An ultrasonic wave probe 10 is scanned either manually or automatically on the surface of the to-be-tested object. Before the explanation of the whole constitution, the structure of the probe used in this invention will be described. The structure of the ultrasonic wave probe 10 is shown in FIG. 5. 14L denotes a longitudinal wave vibrator while 14S denotes a transverse wave vibrator. Both vibrators are disposed on a concentric spherical surface. It is not always necessary that the distances from the center O to both vibrators are equal to each other. Let us refer to FIG. 6 in order to understand the positional relation between the vibrators. FIG. 6 shows the "turnaround" sound pressure transmission rate vs. the incident angle $\theta_i$ of an ultrasonic wave beam incident on a steel material (longitudinal sound wave velocity $V_l=5,850$ m/s, transverse sound wave velocity $V_s=3,230$ m/s) through an acrylic resin shoe 15 (longitudinal sound wave velocity $V_0=2,720$ m/s) in which ultrasonic waves go forward and return backward through the steel material. Abscissae $\theta_{lr}$ and $\theta_{sr}$ denote refraction angles of the longitudinal and transverse waves, respectively. The solid curve represents the transverse wave, while the broken curve represents the longitudinal wave. The figure indicates the following fact. In the range of small $\theta_i$, the longitudinal wave contributes primarily to the ultrasonic wave signal. With an increase in $\theta_i$, the transmission rate of the longitudinal wave decreases and the contribution of the transverse wave gradually increases. Finally, only the transverse wave contributes to the signal. In the ultrasonic wave probe shown in FIG. 5, the longitudinal wave vibrator 14L and the transverse wave vibrator 14S are made to have the following charactersitic.

$15° \leq \theta_l \leq 20°$, $30° \leq \theta_{t1} \leq 35°$, $50° \leq \theta_{t2} \leq 57°$.

Let us refer to FIG. 4 again. The transmission and the reception of ultrasonic wave signals are done at preliminarily specified positions of the ultrasonic wave probe. The operation of transmission and reception is performed once for longitudinal and transverse waves. A longitudinal ultrasonic wave transmitting/receiving section 30 and a transverse ultrasonic wave transmitting/receiving section 13 transmit a high pressure sound wave pulse. Reception signals 12 and 132 from a to-be-tested object 20 are amplified in the ultrasonic wave transmitting/receiving sections 30 and 13, respectively. The longitudinal and transverse wave signals are selected by a multiplexer 40 and thereafter sent to an A/D converter 45. The digitized signals are stored in a wave memory 50.

The waveform data stored in the wave memory 50 are transferred to a memory 113 in a controller 11 through a bus 111. The controller 11 is controlled by a CPU 115 constituted by a microcomputer, etc. Next, explanation will be made of the operation of the controller 11.

The waveform data stored in the wave memory 50 are read out sequentially by CPU 115. The data thus read out are compared with a threshold level of the data which are preliminarily read. Those data which exceed this threshold level are processed in the following way. Assume that the threshold level of the waveform data is $S_{TH}$. Of the waveform data $S_r(x_r, t)$ of a received signal at a position $x_r$ of the ultrasonic wave probe, those data $S_r(x_r, t_i)$ which satisfy $$S_r(x_r, t) > S_{TH} \quad (3),$$

where t denotes time, is operated as follows. Namely, the radius $R_i$ to be written into an image memory 90 is calculated from the following equation.

$$R_i = \frac{v_j \cdot t_i}{2}, \quad (4)$$

where $v_j$ is the sound velocity of the used ultrasonic wave. In the case of the steel material, $v_j=v_L=5,850$ m/s for a longitudinal wave and $v_j=v_s=3,280$ m/s for a transverse wave. Herein, $t_i$ denotes a discrete time which satisfies eq. (3). The sound velocities of the longitudinal and transverse waves are preliminarily introduced from a keyboard 112 into the memory. After the position $x_r$ of the ultrasonic wave probe is transferred to a distance arithmetic unit section 70 through the bus 111, the value of $R_i$ obtained through eq. (4) is transferred to the distance arithmetic unit section 70 through the bus 111.

The waveform data $S_r(x_r, t_i)$ is transferred to a synthesizing arithmetic unit section 60 through the bus 111. After the above-mentioned data setting, a start signal is sent to the distance arithmetic unit section 70 from the controller 11 through the bus 111. In synchronization with the start signal, the coordinate of the image memory 90 (address of the memory) is calculated in order to write the waveform data $S_r(x, t_i)$ into the distance arithmetic unit section 70. The waveform data $Sr(x_r, t_i)$ are written into the image memory 90 along the locus of a radius $R_i$, which is expressed by $$(x_r - x_r)^2 + y_R^2 = R_i^2 \quad (5)$$

where $(x_R, y_R)$ is the coordinate of the image memory 90.

In the distance arithmetic unit section 70, the value of $y_R$ corresponding to $x_R$ or the coordinate of the image memory 90, is calculated from eq. (5) to obtain the value of $(x_R, y_R)$. This is introduced into the image memory 90 as the image address data 71. The image data corresponding to this introduced address are read out from the image memory 90, and supplied to the synthesizing arithmetic unit section 60. In the synthesizing arithmetic unit section 60, the sum of the preliminarily set waveform data and the image data are calculated. The synthesized data 61 are written into the image memory 90 again. The above-mentioned calculation for synthesis is performed for all points $(x_R, y_R)$ that satisfy eq. (5). This can be realized with a high speed hardware which starts automatically with a start signal entering the distance arithmetic unit section 70.

If the condition given by eq. (3) is satisfied for one received signal, eq. (4) is calculated and calculation for synthesis is performed for the coordinate $(x_R, y_R)$ as determined by eq. (5). For every one position $x_r$ of the ultrasonic wave probe, the above calculation is done for two signals of longitudinal and transverse waves through the same procedure.

The above-mentioned operation for the position $x_r$ of the ultrasonic wave probe is applicable to other positions of the ultrasonic wave probe. When the operation for all the positions of the probe is finished, an image which is formed in the image memory 90 is displayed on a display section 95 in accordance with the program of a program storage 114 in the controller 11. If the controller 11 has a CRT 116 provided with a buffer memory for the image, the CRT 116 can also be used as the display.

The whole control is done by the controller 11. The control procedure is executed by an instruction program in the program memory 114. Next, explanation will be made of the operation of the apparatus following the flow of program.

First, the sound velocities $v_L$, $v_S$, the threshold value $S_{TH}$ of the waveform data, and the setting values of the scanning points of the ultrasonic wave probe are supplied from the keyboard 112. This is the setting of the initial values in the hardware. The initial position $x_r$ of scanning of the ultrasonic wave probe is set. A position signal is read into a position detector 80 and compared with the scanning position $x_r$. When they coincide with each other, the longitudinal ultrasonic wave transmitting/receiving section 30 is driven, and an ultrasonic wave is generated by the ultrasonic wave probe 10. Thereafter, the received signal $S_r(x_r, t)$ is stored in the wave memory 50 through the multiplexer 40 and the A/D converter 45. The stored waveform data are introduced into the memory 113 in the controller 11 to execute the above-mentioned process. The distance arithmetic unit section 70, the image memory section 90 and the synthesizing arithmetic unit section 60 are driven to make the operation for synthesis. The same procedure is taken for the transverse wave. Then, the ultrasonic wave probe is moved and the above-mentioned procedure is repeated.

When the read-in process of all the signals is finished, the image is displayed on the display section 95 in accordance with the image data of the image memory 90.

Figure 7:
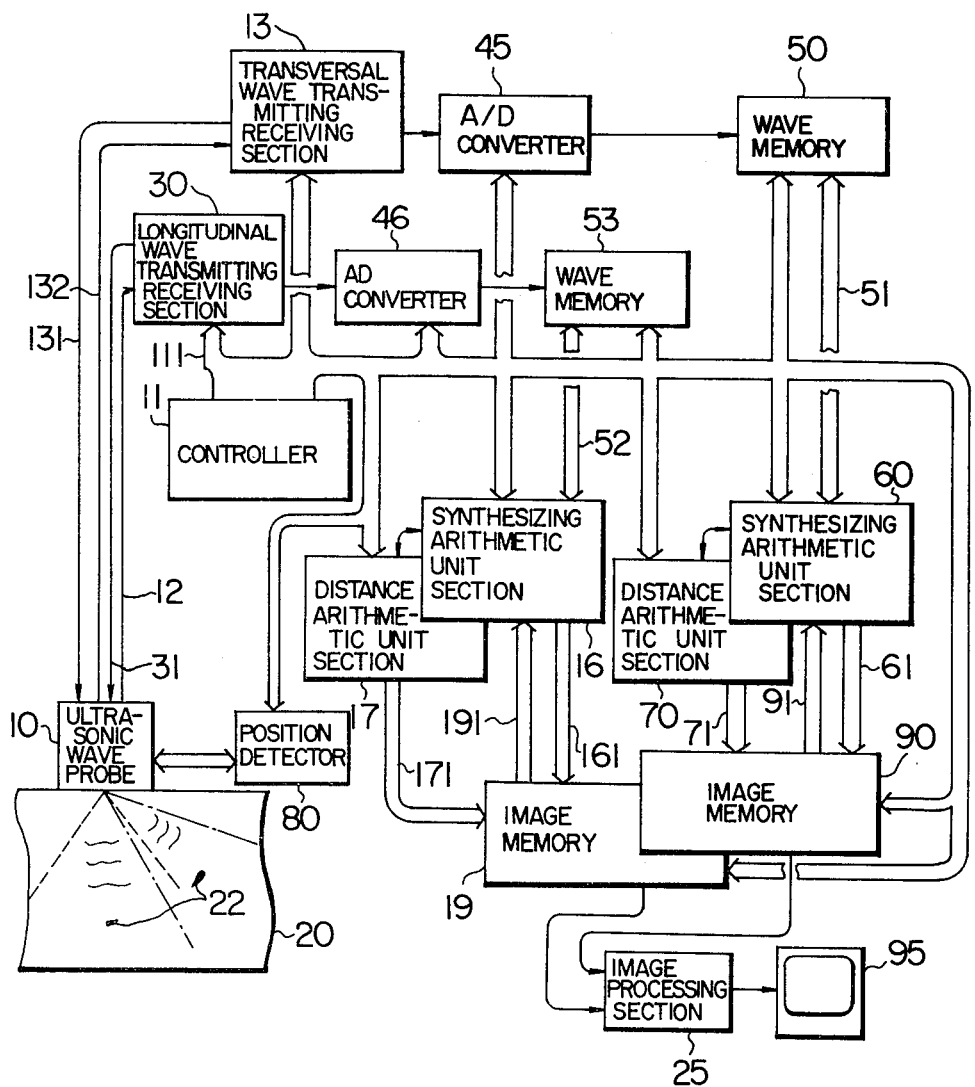
FIG. 7 is a block diagram showing another embodiment of this invention.

FIG. 7 shows another embodiment of this invention, where the read-in processes of the longitudinal and transverse ultrasonic wave signals are forced to occur simultaneously. Therefore, a higher speed data processing can be done with use of the components having the same performance. The apparatus shown in FIG. 7 does not contain any multiplexer, and the transmitting/receiving sections (30, 13), A/D converters (45, 46), wave memories (50, 53), distance arithmetic unit sections (70, 17), synthesizing arithmetic unit sections (60, 16), and image memories (90, 19) have a dual structure. Exclusive buses 51 and 52 are provided as the data transfer buses from the wave memories 50 and 53 to synthesizing arithmetic unit sections 60 and 16, respectively. Hardware constitution is formed in such a manner that the synthesizing arithmetic unit sections 60 and 16 and the image memories 90 and 19 act cooperatively. An image processing section 25 selects or unites the images obtained by the synthesizing arithmetic unit sections 60 and 16, and displays either an image of longitudinal wave or an image of a transverse wave, or a synthesized image of the both images on the display section 95.

I claim:

1. An ultrasonic synthetic aperture testing apparatus comprising transmitting/receiving sections having an ultrasonic probe for transmitting and receiving ultrasonic waves at multiple points on the surface of a to-be-tested object, an operation section including means for accumulating the received signals corresponding to the distances between said multiple points and a reproduction point in a desired region of said object, and a display section which displays an image formed by the result of an accumulation operation by said accumulation means, said ultrasonic probe including at least two vibrators corresponding to different vibration modes for enabling two kinds of ultrasonic waves in different vibration modes to be transmitted and received, said accumulation means accumulating said two kinds of waves in the different vibration modes.

2. An ultrasonic synthetic aperture testing apparatus according to claim 1, wherein said accumulation means which performs the accumulation operation for said two kinds of waves in the different vibration modes includes controller means for varying parameters for said accumulation operation in accordance with the sound velocities of said two kinds of waves.

3. An ultrasonic synthetic aperture testing apparatus according to claim 1, wherein said accumulation means for accumulating the two kinds of waves in different vibration modes includes a plurality of calculation means, each calculation means corresponding to said each mode wave, and a controller means for driving said calculation means separately.

4. An ultrasonic synthetic aperture testing apparatus comprising transmitting/receiving means including an ultrasonic probe movable on a surface of a to-be-tested object for transmitting and receiving ultrasonic waves at multiple points on the surface of the to-be-tested object, operation means for synthesizing the received signals corresponding to the distances between the multiple points and a reproduction point in a desired region of the object, and display means for displaying an image formed in accordance with a synthesizing operation of the operation means, the ultrasonic probe including a first vibrator unit for producing a first type of ultrasonic wave and a second vibrator unit for producing a different second type of ultrasonic wave, the first and second vibrator units being arranged with respect to the surface of the object to be tested so that the first and second vibrator units transmit the first and second types of waves, respectively, into the object at different incident angles, the operation means being responsive to the received first and second ultrasonic waves for synthesizing signals indicative thereof, whereby the display means displays an image in accordance with the output of the operation means.

5. An ultrasonic synthetic aperture testing apparatus according to claim 4, wherein the first and second vibrator units produce the first and second ultrasonic waves, respectively, having different sound velocities in the to-be-tested object.

6. An ultrasonic synthetic aperture testing apparatus according to claim 5, wherein the first vibrator unit produces a longitudinal ultrasonic wave and the second vibrator unit produces a transverse ultrasonic wave, the first vibrator unit being disposed for transmitting the longitudinal ultrasonic wave into the to-be-tested object at incident angles smaller than the incident angles at which the second vibrator unit transmits the transverse ultrasonic wave into the to-be-tested object.

7. An ultrasonic synthetic aperture testing apparatus according to claim 6, wherein the first and second vibrator units are disposed on a spherical surface of the ultrasonic probe.

8. An ultrasonic synthetic aperture testing apparatus according to claim 7, wherein the operation means includes control means for varying parameters for the synthesizing operation in accordance with the different sound velocities of the longitudinal and transverse ultrasonic waves.

9. An ultrasonic synthetic aperture testing apparatus according to claim 8, wherein the transmitting/receiving means includes a first transmitting and receiving unit for transmission and reception of the longitudinal ultrasonic wave and a second transmitting and receiving unit for transmission and reception of the transverse ultrasonic wave.

* * * * *